United States Patent [19]
Bondet

[11] Patent Number: 5,602,603
[45] Date of Patent: Feb. 11, 1997

[54] EYEGLASSES HAVING INTERCHANGEABLE LENSES AND ATTACHMENT CLIPS

[76] Inventor: Pierre N. Bondet, 6, Rue Anatole France, 01100 Oyonnax, France

[21] Appl. No.: 578,888

[22] Filed: Dec. 22, 1995

[51] Int. Cl.$^6$ ............................. G02C 7/10; G02C 9/00; G02C 1/08; G02C 1/04
[52] U.S. Cl. ................. 351/41; 351/44; 351/48; 351/95; 351/108
[58] Field of Search ................ 351/41, 44, 47, 351/48, 57, 58, 69, 83–86, 90–93, 95–98, 103, 104, 105, 106, 107, 108, 109, 110, 154, 178, 442, 443, 159

[56] References Cited

U.S. PATENT DOCUMENTS 2,844,071  5/1953  Schumacher ........................... 351/108

*Primary Examiner*—Huy Mai
*Attorney, Agent, or Firm*—Seed and Berry LLP

[57] ABSTRACT

Eyeglasses having interchangeable lenses which are held in place by inner and outer lens attachment clips mounted at the bridge and temple, respectively, of the frame. The frame and/or lens is resilient so that the frame or lens can resiliently deform to allow the lenses to slide from beneath the lens attachment clips, yet the frame securely holds the lenses in place during use.

22 Claims, 3 Drawing Sheets

EYEGLASSES HAVING INTERCHANGEABLE LENSES AND ATTACHMENT CLIPS

TECHNICAL FIELD

This invention relates to eyeglasses, and more particularly, to eyeglasses having easily interchangeable lenses.

BACKGROUND OF THE INVENTION

There are presently a wide variety of eyewear styles, including sunglasses, that are commercially available. These sunglasses vary both in the style of the frame and the optical characteristics of the lenses mounted in the frame. The need for a wide variety of lens characteristics stems at least in part from the variety of circumstances under which sunglasses are used. For example, blue-tinted lenses are often considered superior for boating and other water-related activities. Neutral-density lenses are considered superior where it is undesirable for the sunglass lenses to change the perceived color of objects. Personal preference also plays a role in the variety of lens tints that are commercially available. Even for a given lens color, different degrees of optical density (i.e., "opaqueness") are often desired, depending upon lighting conditions and personal preference. For example, a higher optical density may be desired for midday conditions, particularly in highly reflective environments such as snow, while a lower optical density may be preferred later in the day, particularly in less reflective environments. As a result, there is a need for a sunglass lens to have a wide variety of optical properties.

In the past, it has been difficult for users to select the optimal lens for the wide variety of conditions in which sunglasses are worn. Not only is there an often prohibitive expense in purchasing sunglasses for a variety of conditions, but there is also the inconvenience of carrying around different sunglasses for different conditions which may vary during a single day. For example, for a skier to have the optimum lens on a partly cloudy day, it would be necessary for the skier to carry at least two pairs of sunglasses having lenses with different optical densities. As a result of the costs and inconvenience of having different sunglasses available for different conditions, most sunglass wearers do not have the optimum lens much of the time. Instead, the sunglass wearer must compromise on a lens that, while not optimum for any lighting condition or activity, is at least somewhat satisfactory for all lighting conditions and activities.

It would be possible for sunglasses to have a wide variety of optical characteristics if the lenses could be easily and quickly removed from the sunglass frames. The wearer would then only need to purchase and carry a variety of lenses. A suitable selection of lenses would be far more compact and less expensive than a comparable selection of eyeglasses. However, lenses are preferably removed from conventional sunglass frames only by optical professionals. Furthermore, frequent removal and reinstallation of lenses in conventional sunglass frames tend to weaken the frictional connection between a lens and frame so that eventually the lens would become loose enough to fall out during strenuous activity.

As a result of the limitations of conventional sunglasses, there is a need for sunglasses that allow the optical properties of the sunglass lenses to be easily and quickly varied by the wearer in a convenient manner.

SUMMARY OF THE INVENTION

The inventive eyeglasses include a frame having a bridge interconnecting a pair of frame sections. Each frame section includes upper and lower frame members extending from the bridge to respective attachment areas. A pair of temples or other securing devices are attached to the attachment areas of respective frame sections. A lens is releasably held in place in each frame section by inner and outer lens attachment clips that extend along at least one of the frame members to retain the lens against the frame members. The inner lens attachment clip extends from the bridge part of the way toward the attachment area, and the outer lens attachment clip extends from the attachment area part of the way toward the bridge so that the inner and outer lens attachment clips are separated from each other by a gap. The frame or the lenses are fabricated from a resiliently compliant material so that the frame or lenses may be resiliently deformed to allow the lenses to be installed in and removed from respective fame sections.

The lens attachment clips preferably extend along outer surfaces of the frame members so that the lens attachment clips are visible along the outer surfaces of the lenses when the eyeglasses are being worn. The inner and outer lens attachment clip of each frame section may extend along either or both of the upper and lower frame members. Lenses may be installed and removed from the frame easily using a variety of techniques in which the lens is installed and removed from either of two directions.

DETAIL DESCRIPTION OF THE INVENTION

Figure 1:
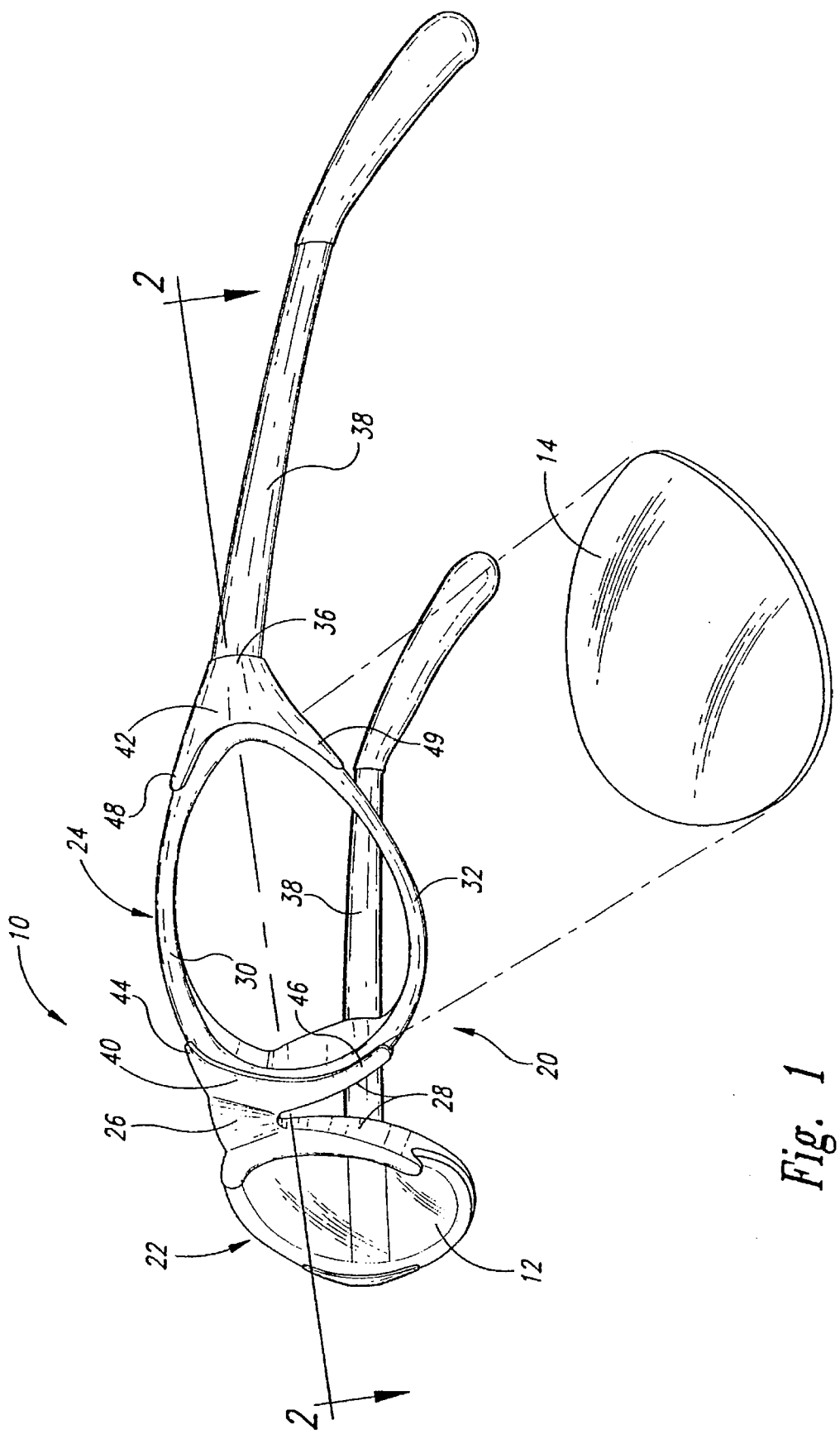
FIG. 1 is an isometric view of one embodiment of the inventive eyeglasses.

One embodiment of the inventive eyeglasses is shown in FIG. 1. The eyeglasses are embodied in sunglasses 10 having lenses 12, 14 mounted in a frame, generally indicated at 20. The frame 20 includes two frame sections 22, 24 interconnected by a bridge 26. Nose pads 28 project downwardly from the bridge 26 to comfortably support the frame 20 on the nose of a wearer.

Each frame section 22, 24 includes an upper frame member 30 and a lower frame member 32, both of which extend from the bridge 26 to an attachment area 36. A pair of temples 38 are pivotally secured to respective attachment areas 36 in a conventional manner. However, other securing devices, such as straps extending between the attachment areas 36 behind the head of the wearer, may be used.

The lens 12 is shown installed in the right frame section 22, and the lens 14 is shown removed from the left frame section 24. As is most apparent in the drawing of the left frame section 24 without the lens 14, the frame section 24 includes an inner lens attachment clip 40 and an outer lens attachment clip 42. The inner lens attachment clip 40 includes a leg 44 that extends upwardly along the upper frame member 30 and a leg 46 that extends downwardly along the lower frame member 32. (It should be noted that the terms "upwardly," "downwardly," "front," "rear," and the like as used herein are with reference to the orientation of the eyeglasses as they are normally worn). The outer lens attachment clip 42 includes an upper leg 48 that extends upwardly along the upper frame member 30 and a lower leg 49 that extends downwardly along the lower frame member 32. Since the lens attachment clips 40, 42 extend only part of the way toward each other, a gap is formed between the lens attachment clips 40, 42.

Figure 2:
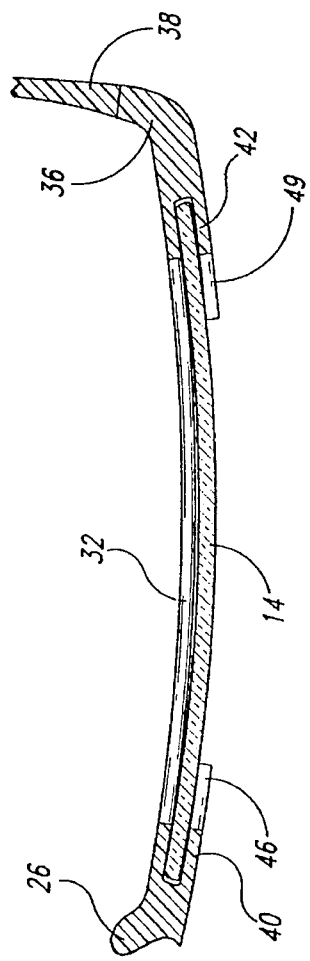
FIG. 2 is a partial cross-sectional view taken along the line 2—2 of FIG. 1.

With reference also to the cross-sectional view of FIG. 2, the clips 40, 42, including their respective legs 44, 46 48, and 49 are spaced slightly from the forward surface of the upper and lower frame members 30, 32. The spacing between the clips 40, 42 and the frame members 30, 32 is preferably slightly less than the thickness of the lens 14. Since the frame 20 is preferably formed from a resilient material, such as resilient plastic, the lens resiliently deforms the clips 40, 42 and/or frame members 30, 32 to securely hold the lens 14 in position. As also shown in FIG. 2, the forward/rearward curvature of the upper and lower frame members 30, 32, respectively, conforms to the forward/rearward curvature of the lens 14 so that the rear edges of the lens 14 are either in contact or closely adjacent the forward surfaces of the frame members 30, 32.

Figure 3:
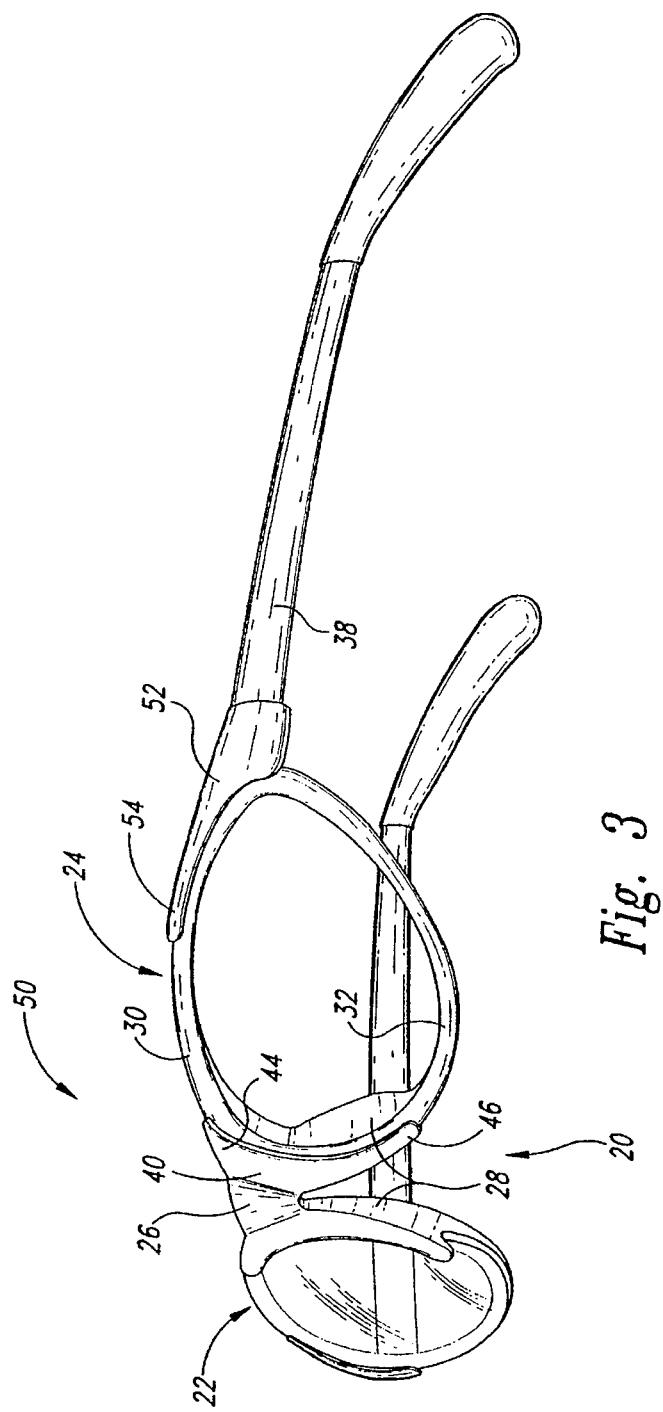
FIG. 3 is an isometric view of another embodiment of the inventive eyeglasses.

Another embodiment of the inventive eyeglasses is illustrated in FIG. 3. The eyeglass 50 shown in FIG. 3 is substantially identical to the eyeglass 10 shown in FIG. 1, and substantially identical components have therefore been given the same reference numerals. Furthermore, in the interest of brevity, an explanation of these substantially identical components will not be repeated.

The eyeglass 50 shown in FIG. 3 differ from the eyeglass 10 shown in FIG. 1 in the configuration of the outer lens attachment clip 52. More specifically, the lens attachment clip 52 includes an upper leg 54 that extends a relatively long distance along the upper frame member 30. Unlike the lens attachment clip 42 shown in FIG. 1, the lens attachment clip 52 does not include a downwardly extending leg.

Figure 4:
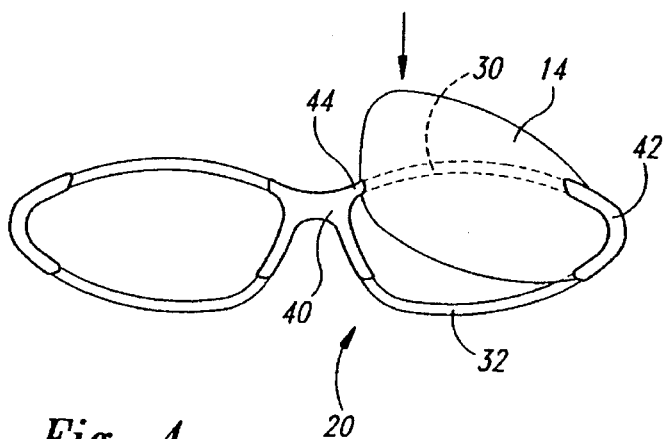
FIG. 4 is a schematic view showing one technique for installing a lens in a frame of the eyeglasses shown in FIG. 1.

A variety of techniques can be used to remove the lenses 12, 14 from the frame 20, with the optimum technique depending upon the specific frame and lens structures and the preference of the user. As illustrated in FIG. 4, the lens 14 can be installed from the top of the frame 20 by placing the outer edge of the lens 14 beneath the outer lens attachment clip 42 and the lower inner edge of the lens 14 beneath the upper leg 44 of the inner lens attachment clip 40. The user then exerts a force on the upper edge of the lens 14 in a downward direction (i.e., toward the lower frame member 32), thereby forcing the remainder of the inner edge of the lens 14 beneath the inner lens attachment clip 40. As shown in FIG. 4, the force is preferably applied to the edge of the lens 14 at a location that is closer to the inner lens attachment clip 40 than it is to the outer lens attachment clip 42. Under some circumstances, it may also be necessary to hold the lens 14 against the frame members 30, 32 while the lens is being pushed beneath the clip 40 to keep the lens between the clip 40 and the frame members 30, 32.

Figure 5:
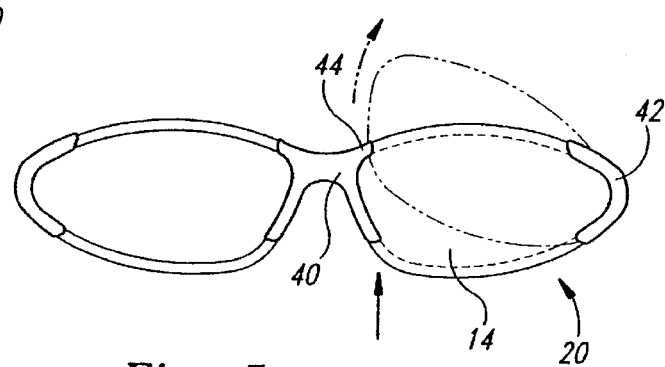
FIG. 5 is a schematic view showing one technique for removing a lens from a frame of the eyeglasses shown in FIG. 1.

The lens 14 can be removed from the frame 20 as shown in FIG. 5. The user applies a force to the lower edge of the lens 14 adjacent the inner lens attachment clip 40. Because of the resilient nature of the frame 20 and/or lens 14, the lens 14 slides out from underneath the lens attachment clip 40, thereby removing the lens 14 from the frame 20. After removal of the lens 14, another lens having different optical characteristics, such as tint or optical density, can be reinstalled in the frame 20 as shown in FIG. 4.

Figure 6:
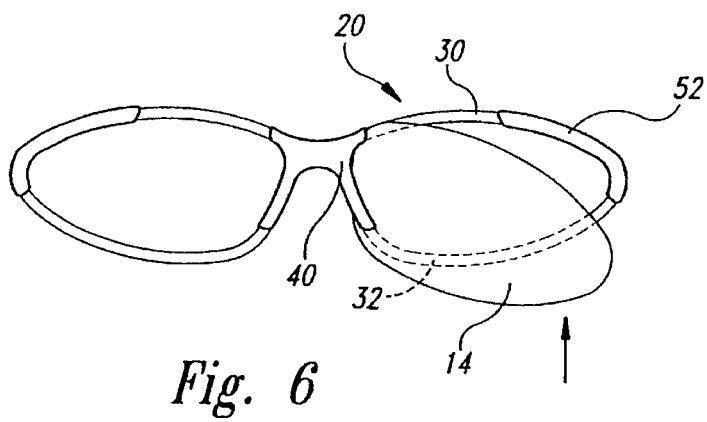
FIG. 6 is a schematic view showing another technique for installing a lens in a frame of the eyeglasses shown in FIG. 1.

In addition to installing the lens 14 from the top of the frame 20, the lens 14 can also be installed from the bottom of the frame 20, as illustrated in FIG. 6. In fact, installation from the bottom is preferred for frames such as that illustrated in FIG. 3 having lens attachment clips 52 that are substantially more extensive along the upper frame member 30 than they are along the lower frame member 32. As illustrated in FIG. 6, the inner edge of the lens 14 is placed beneath the inner lens attachment clip 40 and a force is applied to the lower edge of the lens 14 adjacent the outer lens attachment clip 52. As before, it may be necessary to hold the lens 14 against the frame members 30, 32 as the lens 14 slides beneath the lens attachment clip 52. As before, the resiliency of the frame 20 and/or lens maintains the lens 14 tightly secured within the frame 20.

Figure 7:
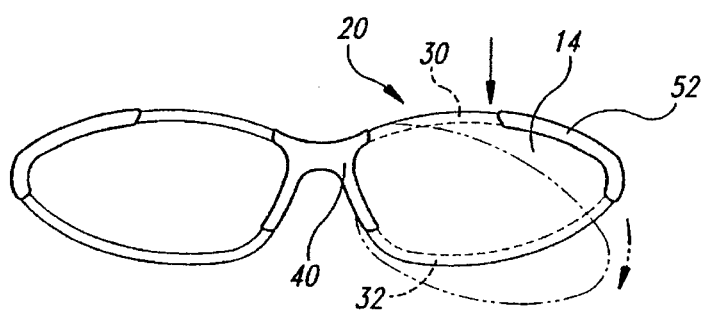
FIG. 7 is a schematic view showing another technique for removing a lens from a frame of the eyeglasses shown in FIG. 1.

As illustrated in FIG. 7, the lens 14 can be removed from the frame 20 by applying a force to the upper edge of the lens 14 directed downwardly, i.e., toward the lower frame member 32, thereby causing the lens 14 to slide from beneath the outer lens attachment clip 52. After the lens 14 has been removed from the lens attachment clip 52, its inner edge can be removed easily from beneath the inner lens attachment clip 40.

It should be reemphasized that the installation and removal techniques shown in FIGS. 4–7 are illustrative only and other techniques may therefore be used depending upon the specific lens and frame structure of the eyeglasses. Also, although specific eyewear styles are shown in FIGS. 1–3, it will be understood that other eyewear styles may be devised without departing from the invention. For example, the clips 40, 44 may be positioned behind the frame members 30, 32 so that the clips 40, 42 hold the lens 14 behind the frame members 30, 32. Other variations will be apparent to one of ordinary skill in the art. Furthermore, although the inventive eyeglasses are described primarily as sunglasses, it will be understood that the invention may also be applied to prescription eyewear.

From the foregoing, it will therefore be evident that, although specific embodiments of the invention have been described herein for purposes of illustration, various modifications may be made without departing from the spirit and scope of the invention and the claims contained herein.

I claim:

1. Eyeglasses having interchangeable lenses, comprising:

a pair of eyeglass lenses;

a frame having a bridge interconnecting a pair of frame sections, each frame section including upper and lower frame members extending from said bridge to respective attachment areas, each of said frame sections further including an inner lens attachment clip extending from said bridge part of the way toward said attachment area and an outer lens attachment clip extending from said attachment area part of the way toward said bridge so that said inner and outer lens attachment clips are separated from each other by a gap, the lens attachment clips of each frame section retaining respective lenses between said clips and at least one of said frame members, said frame or said lenses being fabricated from a resiliently compliant material so that said frame or lenses may be deformed to allow said lenses to be installed in and removed from respective fame sections; and a securing device attached to the attachment areas of said frame sections to retain said frame on the face of a wearer.

2. The eyeglasses of claim 1 wherein said securing device comprises a pair of temples attached to respective attachment areas of said frame sections.

3. The eyeglasses of claim 1 wherein said lens attachment clips are positioned on outer surfaces of said frame sections so that said lens attachment clips are visible when said eyeglasses are being worn.

4. The eyeglasses of claim 1 wherein the inner lens attachment clip of each frame section extends along the upper and lower frame members of said frame section.

5. The eyeglasses of claim 1 wherein the outer lens attachment clip of each frame section extends along the upper and lower frame members of said frame section.

6. The eyeglasses of claim 1 wherein the inner and outer lens attachment clips of each frame section extend along the upper and lower frame members of said frame section.

7. The eyeglasses of claim 1 wherein the outer lens attachment clip of each frame section extends along only the upper frame member of said frame section.

8. The eyeglasses of claim 1 further including a plurality of lens pairs, each of said lens pairs having a tint that differs from the tint of each other lens pair.

9. The eyeglasses of claim 1 wherein said frame is fabricated from a resiliently compliant material so that said frame may be deformed to allow said lenses to be installed in and removed from respective fame sections.

10. The eyeglasses of claim 1 wherein said lenses are fabricated from a resiliently compliant material so that said lenses may be deformed to allow said lenses to be installed in and removed from respective fame sections.

11. An eyeglass frame adapted to receive interchangeable lenses, said frame comprising:

a bridge;

a first pair of upper and lower frame members extending from said bridge to a first attachment area;

a second pair of upper and lower frame members extending from said bridge to a second attachment area, said second pair of upper and lower frame members extending from said bridge in a direction opposite the direction that said first pair of upper and lower frame members extend from said bridge, said frame members being fabricated from a resiliently compliant material;

a first lens attachment clip extending from said bridge part of the way toward said first attachment area;

a second lens attachment clip extending from said first attachment area part of the way toward said bridge so that said first and second lens attachment clips extend toward each other but are separated from each other by a gap, the first and second lens attachment clips being adapted to retain a lens between said clips and at least one of said frame members;

a third lens attachment clip extending from said bridge part of the way toward said second attachment area; and a fourth lens attachment clip extending from said second attachment area part of the way toward said bridge so that said third and fourth lens attachment clips extend toward each other but are separated from each other by a gap, the third and fourth lens attachment clips being adapted to retain a lens between said clips and at least one of said frame members.

12. The eyeglass frame of claim 11 wherein said lens attachment clips are positioned so that said attachment clips contact the outer surface of respective lenses when said lenses are positioned between said clips and said frame members.

13. The eyeglass frame of claim 11 wherein said first and third lens attachment clips extend along the upper and lower frame members of said frame.

14. The eyeglass frame of claim 11 wherein said second and fourth lens attachment clips extend along the upper and lower frame members of said frame.

15. The eyeglass frame of claim 11 wherein said first, second, third, and fourth lens attachment clips extend along the upper and lower frame members of said frame.

16. The eyeglass frame of claim 11 wherein said second and fourth lens attachment clips extend along only respective upper frame members of said frame.

17. The eyeglass frame of claim 11 wherein said frame members are fabricated from a resiliently compliant material so that said frame members may be deformed to allow said lenses to be installed in and removed from said frame.

18. A method of changing eyeglass lenses in an eyeglass frame, said frame having a bridge interconnecting a pair of frame sections, each frame section including upper and lower frame members extending from said bridge to respective attachment areas, each of said frame sections further including an inner lens attachment clip extending from said bridge part of the way toward said attachment area and an outer lens attachment clip extending from said attachment area part of the way toward said bridge so that said inner and outer lens attachment clips are separated from each other by a gap, said method comprising:

removing a lens from each of said frame sections by exerting a force on an edge of said lens adjacent one of said frame members in a direction extending generally parallel to a surface of said lens and toward the other of said frame members while allowing said frame members and/or said lens to deform thereby removing said lens from between said lens attachment clips and said frame members; and installing another lens in each of said frame sections by placing an edge of said lens between said attachment clips and said frame sections and then exerting a force on an edge of said lens adjacent the other of said frame member in a direction extending generally parallel to a surface of said lens and toward said one frame member while allowing said frame members and/or said lens to deform thereby installing said lens in said frame between said lens attachment clips and said frame members.

19. The method of claim 18 wherein said lens is removed by exerting a force on an edge of said lens adjacent said upper frame member in a direction extending toward said lower frame member and installed by exerting a force on an edge of said lens adjacent said lower frame member in a direction toward said upper frame member.

20. The method of claim 18 wherein said lens is removed by exerting a force on an edge of said lens adjacent said lower frame member in a direction extending toward said upper frame member and installed by exerting a force on an edge of said lens adjacent said upper frame member in a direction toward said lower frame member.

21. The method of claim 18 wherein said forces are exerted a on the edge of said lens at a location that is closer to said inner lens attachment clip than it is to said outer lens attachment clip.

22. The method of claim 18 wherein said lens is installed by placing an edge of said lens between said outer attachment clip and at least one of said frame members and then exerting a force on the edge of said lens at a location that is closer to said inner lens attachment clip than it is to said outer lens attachment clip.

* * * * *